Patented Mar. 14, 1944

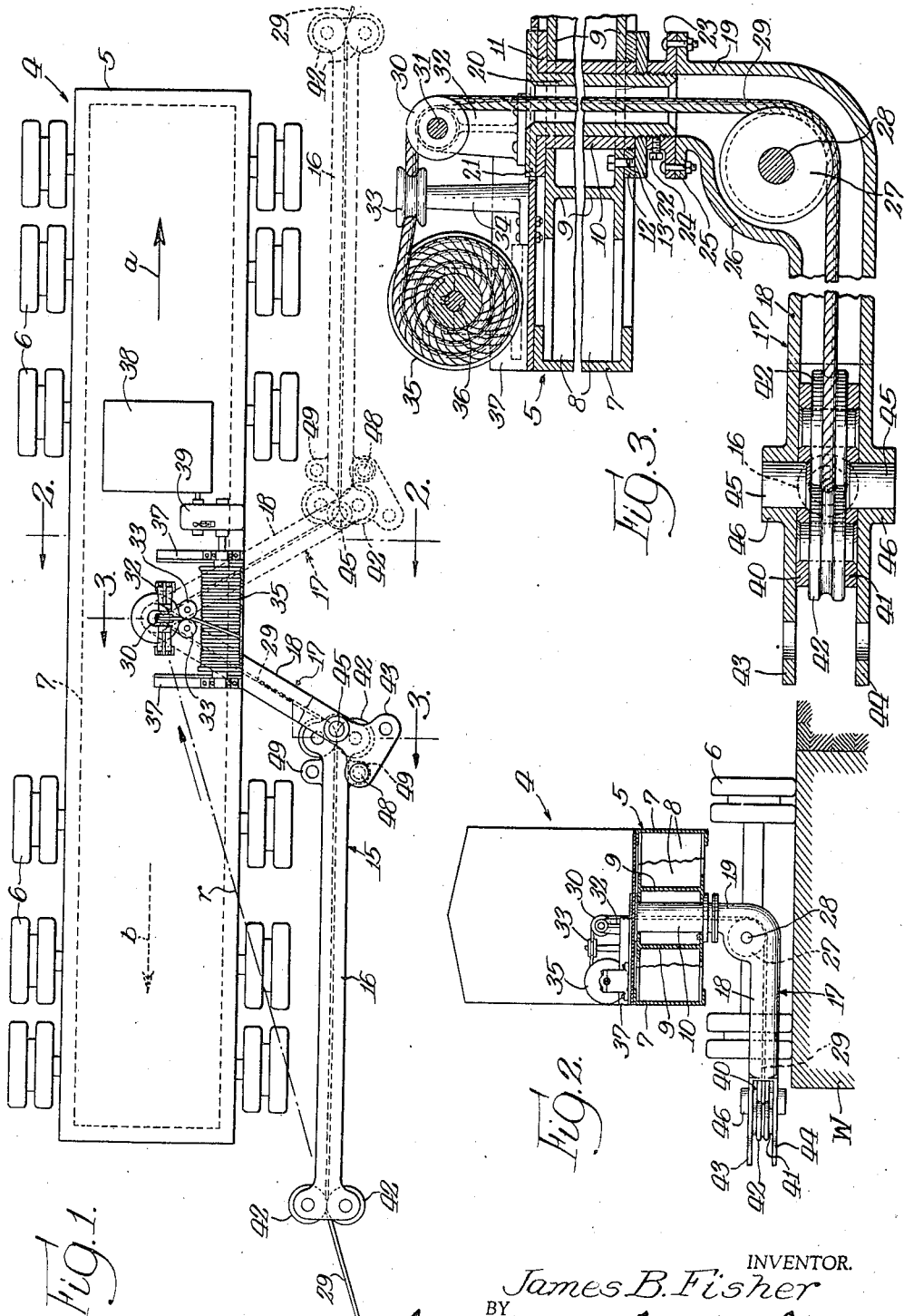

2,343,894

UNITED STATES PATENT OFFICE 2,343,894

TOWING TRUCK

James B. Fisher, Waukesha, Wis., assignor to Waukesha Motor Company, Waukesha, Wis., a corporation of Wisconsin Application May 14, 1942, Serial No. 442,949

7 Claims. (Cl. 254—166)

This invention relates to vehicles intended for use in towing boats or other objects disposed to one side of the vehicle, which vehicle may, for example, be in the form of a towing truck.

I have illustrated my invention, by way of example, as embodied in a truck intended for towing ships through a canal. It is to be understood, however, that within the broader aspects of my invention it may be embodied in any other type of vehicle suitable for towing objects other than ships.

It is known to tow ships through a canal or portions thereof, such as the canal locks, by means of a power driven truck traveling along a retaining wall or other suitable structure at one side of the canal. Such towing trucks usually are provided with an arm fixed to the chassis or frame of the truck and projecting beyond one side thereof for attachment of the cable by means of which the ship is towed, so that the cable clears the supporting wheels and other portions of the truck. In such a truck the pull on the cable tends to turn the truck about the point at which the towing arm is secured thereto, thus swinging one end of the truck in one direction and the other end in the opposite direction. That is objectionable in that it renders difficult maintaining the truck upon its proper course, during travel thereof, and also cause excessive wear of the truck tires and wheels while subjecting the truck as a whole to objectionable stresses.

My invention is directed to a towing vehicle or truck in which the above noted objections to the present type of towing truck are avoided. More particularly, I provide a truck having a towing arm connected thereto in such manner that the load is applied substantially at the center of the truck frame or chassis, by means of a towing arm so arranged that there is no objectionable tendency to swing or turn the truck about the point of attachment of the towing arm. This arm is formed in two sections normally rigidly secured together, one of which is pivoted at the center of the truck for swinging movement about a vertical axis, these arms being provided with means for leading a cable along them to an effective point of attachment of the cable to the truck centrally thereof, the portion of the cable led along the sections of the arm constituting, in effect, two sides of a parallelogram of forces such that the resultant of the pull on the cable passes through the center of the truck frame or chassis. In order that the truck may be used for towing in either direction, I provide means whereby relative adjustment between the sections of the arm may be made and these sections may then be rigidly secured together. Further objects and advantages of my invention will appear from the detail description.

In the drawing:

Figure 1 is a semi-diagrammatic plan view of a towing truck embodying my invention;

Figure 2 is a sectional view taken substantially on line 2—2 of Figure 1, certain parts being broken away; and Figure 3 is a sectional view, on an enlarged scale, taken substantially on line 3—3 of Figure 1, with certain parts broken away and certain other parts shown in elevation.

Conveniently, the truck, designated generally by the reference number 4, comprises a chassis or frame 5 suitably mounted on a plurality of ground wheels 6, in a known manner, which may be provided with pneumatic tires. The chassis or frame 5 may be of suitable construction, including channel side sills 7 connected together by suitably spaced transversely extending I-beam 8. At the central portion of chassis 5 I provide two I-beams 8 spaced a short distance apart and connected by two short I-beams 9 disposed lengthwise of frame 5 and also spaced a short distance apart. The flanges of the two central I-beams 8 and of the I-beams 9 are suitably formed to fit about a cylindrical bearing sleeve 10 extending vertically through frame 5 at the center thereof and provided, at its upper end, with an outwardly extending circumferential flange 11 seating on the top flanges of the I-beams 8 and 9. A flange ring 12 is screwed on the lower end of sleeve 10 and seats against the bottom flanges of I-beams 8 and 9, ring 12 being locked in position in any suitable manner, conveniently by means of a bolt 13 passing through the bottom flange of one of the beams 9 and threading into ring 12. Sleeve 10 is thus confined against vertical movement and is held securely in position, providing a tubular bearing member or sleeve located centrally of frame 5, providing convenient means for attaching to frame 5 centrally thereof a towing arm 15.

Towing arm 15 comprises an outer section 16, preferably of circular cross section, as shown in Figure 3, and an inner section 17, also preferably of circular cross section, this inner section being of approximately L-shape providing an outer horizontal member 18 and an inner vertical member 19. Member 19 comprises a cylindrical tubular neck 20 fitting through sleeve 10 for turning movement therein about a vertical axis, this neck being provided at its upper end with an outwardly extending circumferential flange 21 which seats upon the upper face of flange 11 of bearing sleeve 10. A flange ring 22 is screwed on the lower portion of neck 20 and bears against the under face of flange ring 12 serving, in conjunction with flange 21, to confine neck 20 against vertical movement. A bolting flange 23 is screwed on neck 20 from the lower end thereof and contacts ring 22, for securing the latter in position. Bolting flange 23 is secured against turning movement on neck 20 in any suitable manner, conveniently by means of a set screw 24. The lower portion of vertical member 19, which member comprises neck 20 and flange ring 22 and bolting flange 23, is provided with an outwardly extending flange 25 suitably secured, conveniently by bolting, to the bolting flange 23. Section 17 of the towing arm 15 is thus mounted on frame 5 for swinging movement about a vertical axis located centrally of the frame.

Vertical member 19 of section 17 is provided, at its lower portion, with an enlargement 26 which accommodates the outer portion of a cable receiving sheave 27 rotatably mounted, by means of a pin 28, to turn about a horizontal axis. The sheave 27 extends inwardly of member 19 to the central portion thereof for reception of a towing cable 29 which passes therefrom upwardly through vertical member 19, including the neck 20, axially thereof. Cable 29 passes over a sheave 30, mounted for rotation about a horizontal axis by means of a sheave pin 31 mounted in the upper ends of appropriately shaped and disposed brackets 32 suitably secured to frame 5. From the top of sheave 30 the cable passes between two sheaves 33 mounted for rotation about vertical axes on the upper ends of posts 34 suitably secured to frame 5. Cable 29 then passes to a winding drum 35 secured on a horizontal shaft 36 rotatably mounted in a suitable known manner in end supporting frames 37 appropriately mounted on the chassis or frame 5. Shaft 36 may be driven from a power plant 38, through a suitable known reducing and controlling unit 39, for driving drum 35 in either direction and winding the cable on to and off of the drum as required, it being understood that shaft 36, and therefore drum 35, normally is locked against rotation in either direction. The power plant 38 is indicated diagrammatically in Figure 1, and may be of any suitable known type and located as shown or in any other suitable location, it being understood that appropriate driving connections are provided between the power plant and the ground wheels G for propelling the vehicle, as well as suitable control and steering means, all of which is well known in the art and need not be illustrated nor described in greater detail.

The outer arm section 16 is tubular and may be of circular cross section for substantially its full length. At each end section 16 is provided with a head comprising upper and lower flat plates 40 and 41, respectively, which receive between them two cable sheaves 42 mounted for rotation about vertical axes. The head at the end of section 16 adjacent section 17 fits between upper and lower plates 43 and 44, respectively, constituting a head at the outer end of section 17, and have secured therein bearing pins 45 extending through bearing collars 46 carried by plates 43 and 44, conveniently formed integrally therewith. The pins 45 are so disposed that their common axis passes between the sheaves 42 mounted in the head of section 16 thus pivoted to section 17 and is located at the point of tangency between cable 29 and either of the sheaves about which this cable passes.

In Figure 2 the truck is shown as traveling along the top of a retaining wall $w$, which may be formed of concrete and located at one side of a canal. If it is desired to tow a ship in the direction indicated by the arrow $a$ shown in Figure 1, the cable 29, suitably attached to the ship, is lead upward therefrom through the sheaves 42 at the end of section 16 remote from section 17 of the towing arm, the latter then occupying the position shown in Figure 1, then between the sheaves 42 at the other end of section 16 and from the latter sheave about sheave 27 and thence upward over sheave 30 and between sheave 33 to drum 35. The towing cable is thus guided through and along sections 16 and 17 of the towing arm so as to provide two runs of the cable respectively parallel with the arm sections, and the cable is effectively attached or connected to the truck frame at the point of tangency between sheave 27 and the vertical run of the cable, for pulling the load. The drum 35 provides convenient means for varying the effective length of the cable as conditions may require, while also providing anchorage for the cable. In that connection, it will be noted that drum 35 is disposed above frame 5, adjacent the side thereof at which section 16 of the towing arm is located, whereas the effective point of attachment of the cable to the truck frame, located on the vertical axis about which the towing arm swings, is located below frame 5. That relation between the drum and the point of attachment of the cable is of advantage in that, by the opposite reactions of the cable, it greatly reduces or eliminates any tendency toward lateral tilting of the truck, the disposition of the point of effective attachment of the cable to the truck below frame 5 being of particular advantage in that respect.

When the towing arm is disposed as shown in full lines in Figure 1, with the sections 16 and 17 thereof in the angular relation shown, section 16 is rigidly secured to the outer end of section 17 so as to eliminate the possibility of relative movement therebetween. That may be effected in any suitable manner, conveniently by means of a locking pin 48 passing through aligned openings in plates 43 and 44 and through a heavy boss 49 secured to the outer side of section 16, in its position shown in full lines in Figure 1, conveniently by being formed integrally therewith, this pin in cooperation with the pivot pins 45 and associated parts effectively securing the arm sections 16 and 17 rigidly together.

During the towing operation, with the truck traveling in the direction indicated by the arrow $a$, the cable 29 is of course under tension and the load is transmitted to the truck at the point of tangency between sheave 27 and the vertical run of cable 29, the portion of the cable passing along the arm sections 16 and 17 being disposed in angular relation and constituting, in effect, two sides of a parallelogram of forces the resultant of which is indicated by the line $r$ and passes through the center of frame 5. The load is thus applied at the center of the truck frame and there is no tendency to cause turning of the truck with resulting excessive wear of the truck tires or wheels and objectionable stresses, above referred.

When it is desired to tow a ship in the opposite direction, that is, in the direction indicated by the dotted line arrow b shown in Figure 1, the towing arm is swung from its full line position to its dotted line position. In order to accomplish that, the locking pin 48 is withdrawn thus permitting arm 16 to be turned about the pin 45 into position to extend from the other side of section 17, that is, from the side of section 17 opposite to that from which section 16 extends in its full line position, after which the sections 16 and 17 are rigidly secured together, by inserting pin 48 through aligned openings in plates 43 and 44 and through a second lug 49 at the other side of section 16. The operation of the towing arm and the truck during travel of the latter in the direction indicated by the dotted line arrow b is the same as when the truck is traveling in the direction of the arrow a, and need not be repeated. In either case, the towing arm disposes the cable outwardly beyond the side of the truck so as to clear the ground wheels thereof as well as the truck body, and the effective point of attachment of the cable to the truck is disposed centrally of the truck frame or chassis 5, as and for the reasons previously stated.

I have illustrated my invention, by way of example, as applied to a towing truck in which it is desirable that the resultant of the forces of the runs of the cable lead along the arm sections 16 and 17 pass through the center of the truck frame, for reasons previously explained. In the broader aspects of my invention, however, that is not essential in certain cases, in which the resultant may pass through some other suitably located point of the truck or vehicle frame. For example, in towing a plow by means of a tractor, a towing arm comprising angularly related sections dispose to maintain the cable clear of the tractor and mounted for swinging movement about a vertical axis is advantageous, even though the resultant of the forces to which the cable is subjected does not pass through the center of the tractor frame. Accordingly, I intend to include within the scope of my invention the provision of a towing arm having angularly related sections disposed and mounted in the manner and for the purposes herein broadly disclosed.

I claim:

1. In combination, a power driven vehicle comprising a frame, a towing arm comprising an inner section extending generally transversely of and outward beyond said frame and an outer section rigidly secured to said inner section and extending generally lengthwise of and spaced outwardly from said frame, said inner section being pivotally mounted on said frame and free therefrom for swinging movement about a vertical axis in the use of said vehicle for towing, and means for guiding a towing cable along said sections of said arm to provide two runs of said cable respectively substantially parallel with the arm sections and for attaching said cable to said frame, said guiding and attaching means comprising means for transmitting the load on the cable during the towing operation to said frame at a point substantially on the axis of swinging movement of said inner section.

2. In combination, a power driven vehicle comprising a frame, a towing arm comprising an inner section extending generally transversely of and outward beyond said frame and an outer section rigidly secured to the outer end of said inner section and extending therefrom generally lengthwise of said frame, said inner section being pivotally mounted on said frame substantially at the center thereof and free therefrom for swinging movement about a vertical axis in the use of said vehicle for towing, and means for guiding a towing cable along said sections of said arm to provide two runs of said cable respectively substantially parallel with the arm sections and for attaching said cable to said frame substantially centrally thereof.

3. In combination, a power driven vehicle comprising a frame, a towing arm comprising an inner section and an outer section, said inner section being of generally L-shape providing a substantially vertical member pivotally mounted centrally of said frame for swinging movement about a vertical axis and a substantially horizontal member rigidly secured to one end of said vertical member extending therefrom outward beyond said frame generally transversely thereof, said outer section being rigidly secured to the outer end of said inner section extending therefrom generally lengthwise of said frame, and means for guiding a towing cable along said sections of said arm to provide two runs of said cable respectively substantially parallel with the arm sections and for attaching said cable to said frame substantially centrally thereof.

4. In combination, a power driven vehicle comprising a frame, a towing arm comprising an inner section and an outer section, said inner section being of generally L-shape providing a substantially vertical member extending upward through said frame centrally thereof from below mounted to swing about a vertical axis and a substantially horizontal member rigidly secured to the lower portion of said vertical member extending therefrom outward beyond said frame generally transversely thereof, said outer section being rigidly secured to the outer end of said inner section extending therefrom generally lengthwise of said frame, and means for guiding a towing cable along said sections of said arm to provide two runs of said cable respectively substantially parallel with the arm sections and for attaching said cable to said frame substantially centrally thereof.

5. In combination, a power driven vehicle comprising a frame, a towing arm comprising an inner section and an outer section, said inner section being of generally L-shape providing a substantially vertical member extending upward through said frame centrally thereof from below mounted to swing about a vertical axis and a substantially horizontal member rigidly secured to the lower portion of said vertical member extending therefrom outward beyond said frame generally transversely thereof, said outer section being pivoted to the outer end of said inner section for relative adjustment about a vertical axis into either of two positions extending in either direction from said inner section generally lengthwise of said frame, means for securing said outer section in either position relative to said inner section, and means for guiding a towing cable along said sections of said arm to provide two runs of said cable respectively substantially parallel with the arm sections and for attaching said cable to said frame substantially centrally thereof.

6. In combination, a power driven vehicle comprising a frame, a towing arm comprising an inner section and an outer section, said inner section being of generally L-shape providing a substantially vertical member extending upward through said frame centrally thereof from below mounted to swing about a vertical axis and a substantially horizontal member rigidly secured to the lower portion of said vertical member extending therefrom outward beyond said frame generally transversely thereof, a pair of cable receiving sheaves mounted at each end of said outer section for rotation about vertical axes, means pivoting said outer section at one end to the outer end of said inner section for relative adjustment about a vertical axis extending between the two sheaves at said one end into either of two positions extending in either direction from said inner section generally lengthwise of said frame, means for leading a cable from said pairs of sheaves along said inner section to an effective point of attachment substantially at the center of said frame, and means for rigidly securing said outer section in either of its said adjusted positions.

7. In combination, a power driven vehicle comprising a frame, a towing arm comprising an inner section and an outer section, said inner section being of generally L-shape providing a substantially vertical member extending upward through said frame centrally thereof from below mounted to swing about a vertical axis and a substantially horizontal member rigidly secured to the lower portion of said vertical member extending therefrom outward beyond said frame generally transversely thereof, a pair of cable receiving sheaves mounted at each end of said outer section for rotation about vertical axes, means pivoting said outer section at one end to the outer end of said inner section for relative adjustment about a vertical axis extending between the two sheaves at said one end into either of two positions extending in either direction from said inner section generally lengthwise of said frame, a cable winding drum adjacent the upper end of said vertical member, and means for leading a cable from said pairs of sheaves along said inner section and upward to said drum comprising a sheave carried by said vertical member and a sheave mounted thereabove disposed to receive a vertical run of the cable extending substantially axially of said vertical member.

JAMES B. FISHER.